United States Patent [19]

Keem et al.

[11] Patent Number: 4,525,853
[45] Date of Patent: Jun. 25, 1985

[54] POINT SOURCE X-RAY FOCUSING DEVICE

[75] Inventors: John E. Keem, Bloomfield Hills; Gerald F. Marshall, Grosse Pointe Woods, both of Mich.

[73] Assignee: Energy Conversion Devices, Inc., Troy, Mich.

[21] Appl. No.: 542,886

[22] Filed: Oct. 17, 1983

[51] Int. Cl.$^3$ ............................................ G01N 23/20
[52] U.S. Cl. ........................................ 378/84; 378/83
[58] Field of Search ................... 378/84, 85, 70, 43, 378/36; 350/294, 293, 641

[56] References Cited

U.S. PATENT DOCUMENTS

| | | | |
|---|---|---|---|
| 1,865,441 | 7/1932 | Mutscheller | 350/294 |
| 2,759,106 | 8/1956 | Wolter | 350/294 |
| 3,010,358 | 11/1961 | Siegler | 350/294 |
| 3,397,312 | 8/1968 | Okano | 378/84 |
| 3,777,156 | 12/1973 | Hammond et al. | 378/84 |
| 3,836,804 | 9/1974 | Frens et al. | 378/125 |
| 4,084,089 | 4/1978 | Zingaro et al. | 378/84 |
| 4,229,499 | 10/1980 | Jenkins | 378/84 |
| 4,238,265 | 12/1980 | Deminet | 350/293 |
| 4,261,771 | 4/1984 | Dingle et al. | |
| 4,317,043 | 2/1982 | Rosenbluth et al. | 378/70 |

OTHER PUBLICATIONS

Spiller, et al., Evaporated Multilayer Dispersion Elements for Soft X-Rays, 1981, pp. 124–130.
Underwood, et al., Synthetic Multilayers as Bragg Diffractors for X-Rays, 1981, pp. 170–178.
Haelbich, et al., Smooth-Multilayer Films Suitable for X-Ray Mirrors, 1979, pp. 184–186.
Schuller, New Class of Layered Materials, Jun. 16, 1980, pp. 1597–1600.
Underwood, et al., Layered Synthetic Microstructures: Properties and Applications in X-Ray Astronomy, 1979, pp. 123–130.
In Furnas, et al., Toroidal Monochromators in Hybrid XRF System Improve Effectiveness of EDXRF Fold, 1982, FIGS. 1 and 2 and accompanying discussion.
In Furnas, et al., Use of Toroidal Monochromators in an Hybrid XRF System to Obtain Increased Effectiveness Ratios, 1982, pp. 245–249, section entitled "Experimental", beginning on p. 2, specifically section III on p. 3.
In Kuntz, et al., Detemination of Lead in Paint by Energy Dispersive X-Ray Fluorescence Spectrometry, (Apr. 1982) FIG. 1 and accompanying discussion.
In Priedhorsky, Epoxy Replication for Wolter X-Ray Microscope Fabrication, 1981, FIG. 1 and accompanying discussion.
Marr, Multilayer Films for Soft X-Ray Optics, 1983.
Berreman, Curved-Crystal X-Ray Monochromator Efficiency, Jan. 15, 1979, pp. 560–567.
In Price, X-Ray Microscopy Using Grazing Incidence Reflection Optics, 1981, FIG. 3 and accompanying discussion.
Spiller et al, "Controlled Fabrication of Multilayer Soft-X-Ray Mirrors", Appl. Phys. Lett., 37(11) Dec. 1980, pp. 1048–1050.
Spiller, "Reflective Multilayer Coatings for the Far UV Region", Applied Optics, vol. 15, No. 10, Oct., 1976.
Underwood et al, "The Renaissance of X-ray Optics", Physics Today, Apr., 1984.

Primary Examiner—Alfred E. Smith
Assistant Examiner—Charles Wieland
Attorney, Agent, or Firm—Lawrence G. Norris

[57] ABSTRACT

Point source X-ray focusing device structures, materials and methods of forming them are provided which exhibit a greatly increased total reflected intensity for a desired X-ray wavelength of interest. The devices include one or more focusing elements which each have a focusing surface with a plurality of layer pairs formed thereon. The focusing surface and the layer pairs are designed to collect, reflect and concentrate the maximum X-ray flux from a point source to a focus point for a particular wavelength of interest.

13 Claims, 26 Drawing Figures

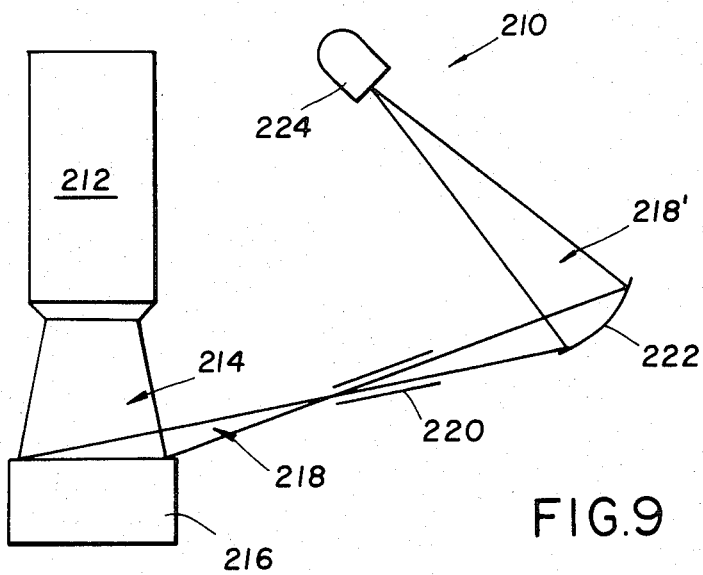
FIG.9
FIG.10
PRIOR ART
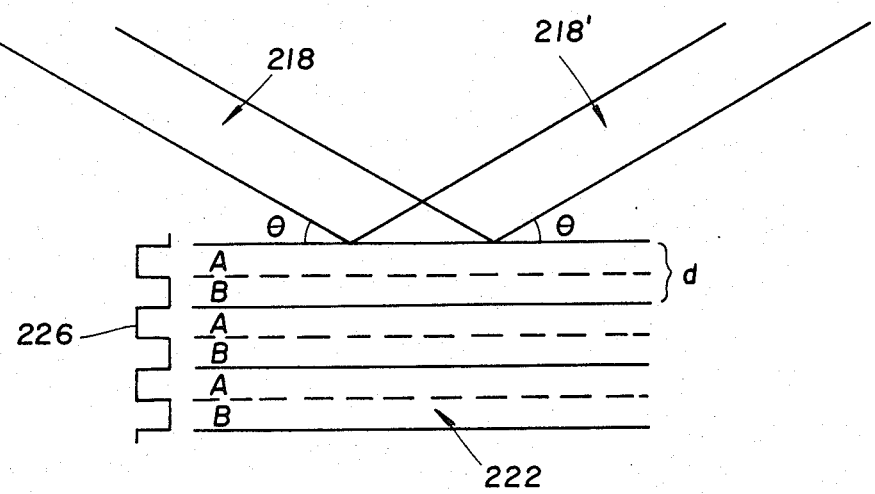

POINT SOURCE X-RAY FOCUSING DEVICE

BACKGROUND OF THE INVENTION

This invention relates to an improved point source X-ray focusing device. The device utilizes synthetic layered structures which are free from the constraints of crystalline symmetries. The layers are formed on a focusing element surface which is selected to collect, reflect and focus the maximum X-ray flux from the point source to a focus point for a particular wavelength of interest.

Commercial X-ray dispersive structures are formed from crystalline structures such as LiF, metal acid phthalates (map), pyrolytic graphite and Langmuir-Blodgett (LB) films. These materials have very restrictive lattice spacing constraints. In addition, the LB and map devices have severe environmental limitations and must be operated near room temperature in a dry environment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo or hetero epitaxially grown planes or film layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal substrate. The desired superlattice is a single crystal synthetic material with good crystalline quality and long range order. The thickness of each layer pair (A and B) is defined as the "d" spacing. These structures are not appropriate for most reflective or dispersive structures due to the small electron density contrast between the layers. These structures being essentially single crystals with extra super lattice periodicities also suffer from restrictive d spacing, associated with the constraint that the entire structure be a single crystal.

In addition to the MBE type of superlattice construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing across or through the structures.

These materials can be thought of as synthetic crystals or crystal analogues in which it is defined as crucial that the long range periodicity or repetition of a particular combination of layers be maintained. These structures are both structurally and chemically homogeneous in the x-y plane, and are periodic in the third (z) direction. These construction approaches particularly sputtering, can utilize a greater variety of materials than evaporation. The d spacing in a structure can be graded throughout the structure to provide some reflectivity for a range of X-ray wavelengths, but they do not achieve optimum control of higher order reflections and the deposition precision is not as good as desired. This results in interfaces and layer thicknesses which are not as precise as desired for certain applications. One desired goal in producing high efficiency X-ray reflectors is to produce a maximum contrast in electron density across the most precisely defined interface which produces the greatest number of orders of reflection. Further, the smoothness of the layer surface must be as precise as possible to minimize scattering caused by the surface variations.

X-ray dispersive structures and methods of making them are described in copending application, Improved X-ray Dispersive And Reflective Structures And Method Of Making The Structures, filed June 6, 1983, U.S. Ser. No. 501,659, John E. Keem et al., The layered structures described therein and the methods of making them are particularly applicable to making the focusing devices of the present invention. These structures and methods are discussed infra in detail beginning with reference to FIGS. 9 through 18.

Prior art and point source X-ray devices have been formed from cones which have an internal surface coated typically with W or Pt. The cones focus a very small amount of the X-ray intensity since the cones only collect and reflect X-rays which have a very small incidence angle (grazing incidence) which is below the angle of total internal reflection ($\theta_g$).

A suggestion has been made to utilize lsm structures in imaging grazing angle incidence systems. A W:C layered structure on a paraboloid with a mean angle of 2.66° was suggested for a telescope-monochromator for the Fe XXV line at 1.86 Å. Underwood et al., *Layered Synthetic Microstructures: Properties and Applications in X-Ray Astronomy*, 184 SPIE 126 (1979).

SUMMARY OF THE INVENTION

The disadvantages of the prior art are overcome by an improved point source X-ray focusing device. The devices are formed from a focusing element which is formed with a focusing surface from a section transverse to the axis of revolution of an ellipse. A plurality of layer pairs are selected and formed on the focusing surface to focus X-rays at a wavelength of interest emitted by a point source to a point of focus. The focusing device increases the flux of the focused X-rays at the wavelength of interest which are collected, reflected and concentrated at the point of focus over previous systems.

A method of replicating the focusing element with the focusing surface thereon, includes forming the layer pairs on an inverse master surface and then removing the pairs so formed to form the focusing element.

BRIEF DESCRIPTION OF THE DRAWINGS

FIG. 9 is a partial diagrammatic representation of one embodiment of X-ray analysis system which can utilize the X-ray dispersive structures of the invention;

FIG. 10 is an exploded partial sectional view of a prior art X-ray dispersive structure illustrating the X-ray dispersive pattern;

DESCRIPTION OF THE PREFERRED EMBODIMENTS

Figure 1:
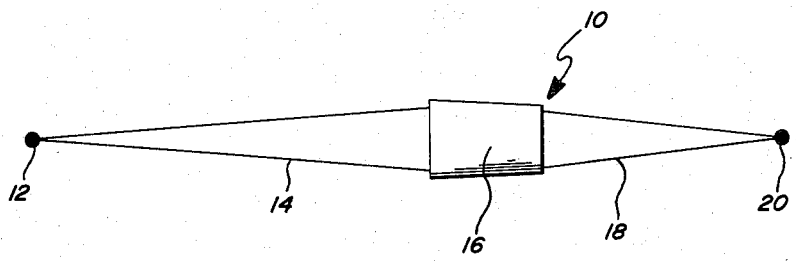
FIG. 1 is a diagrammatic representation of a prior art embodiment of X-ray point source imaging system.

Referring to FIG. 1, there is shown a diagrammatical representation of a conventional X-ray imaging system 10. The system 10 includes a point X-ray source 12 which directs a beam of X-rays 14 at a cone 16. A beam 18 is reflected off the inside surface of the cone 16 which is imaged on a spot 20. The cone 16 can be made from a number of materials and typically is made from a metal with a coating of platinum or tungsten. The X-rays in the beam 14 which arrive below the grazing incidence angle ($\theta_g$) are reflected by the cone 16 to the image point 20.

The intensity (R) of the X-ray beam 14 which is reflected from the cone 16 is directly proportional to the solid angle intersected by the cone 16 or other focusing device. The grazing incidence angle ($\theta_g$) for the cone 16 is less than the angle of total internal reflection for the wavelength of interest. For Mg K$\alpha$ radiation (9.89 Å), the angle $\theta_g$ for the cone 16 utilizing a W or a P+ coating is less than 1°. Therefore the solid angle intercepted and hence the collected X-ray intensity is very small.

The selection of a proper focusing element is best described with respect to FIGS. 2A–2G. The focusing element is formed with a focusing surface from a section transverse to the axis of revolution of an ellipse. This involves defining the eccentricity of the ellipsoid, the focal separation and the optimum focusing surface. For an ellipse, the eccentricity e is defined by e = cosine $\theta_e$, which as a function of $\theta_e$ is a curve 22 defined by $f(\theta_e) = e(1-e^2)$. This curve 22 is representative of the collection efficiency as a function of the equitorial angle $\theta_e$. The angle $\theta_m$ of maximum collection efficiency can be solved as $$\theta_m = \text{cosine}^{-1}\left(\sqrt{\frac{1}{3}}\right) = 54.7°.$$

Therefore, if one was to ignore other factors and presume that all the energy is reflected, an infinitesimal focusing surface would be selected with an equitorial angle of 54.7°. In fact, the response characteristic of the coating or layer pairs adds another factor as shown by FIG. 2B.

Figure 2A:
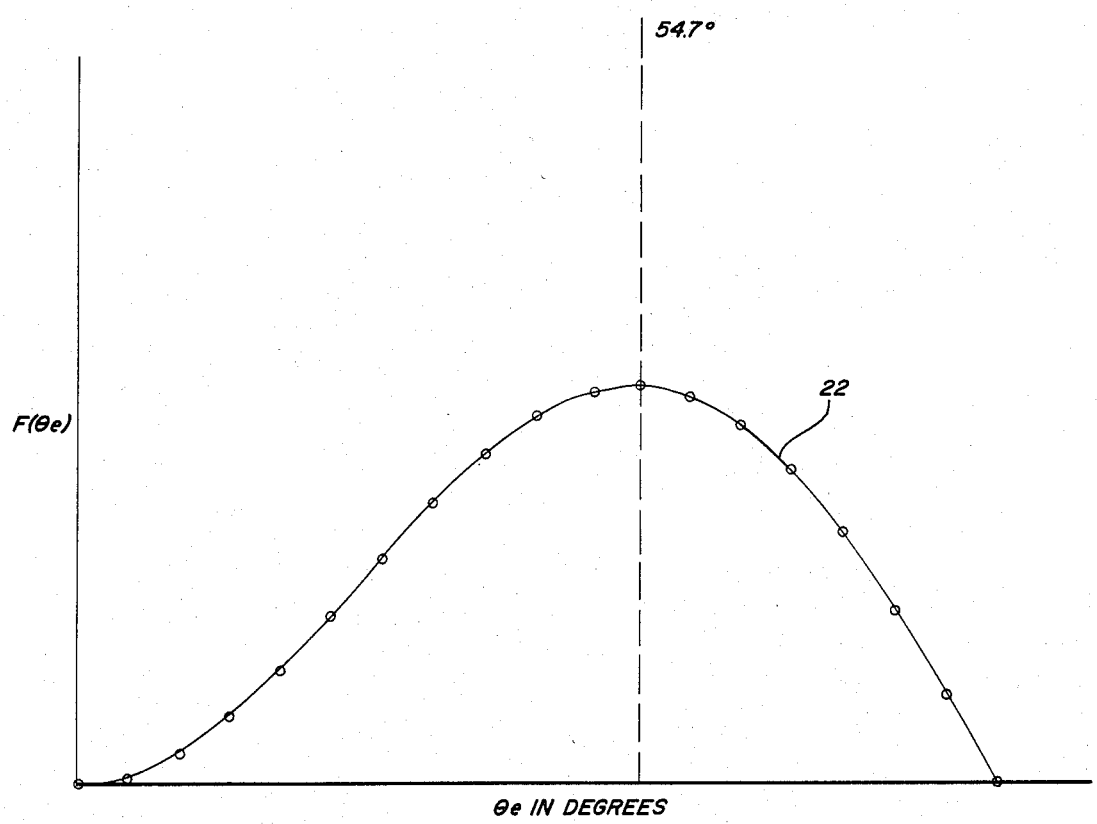
FIGS. 2A–2G are a diagrammatical description of the selection and formation of a particular focusing element of the invention.
Figure 2B:
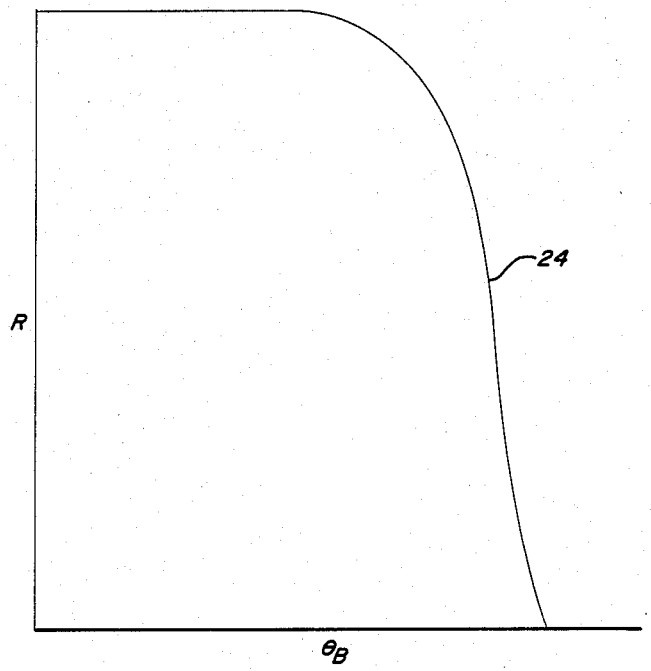

FIG. 2B illustrates an experimental curve 24 which depicts the reflectivity R as a function of Bragg's angle $\theta_B$ for a particular set of layer pairs of particular materials and having a characteristic d spacing as defined by Bragg's law $\lambda = 2d \sin \theta_B$. This can be solved for the angle $\theta_B$ as $$\theta_B = \text{sine}^{-1}\left[\frac{\lambda}{2d}\right].$$

Therefore, a point on the curve 24 is defined by a particular wavelength $\lambda$ of interest.

Figure 2C:
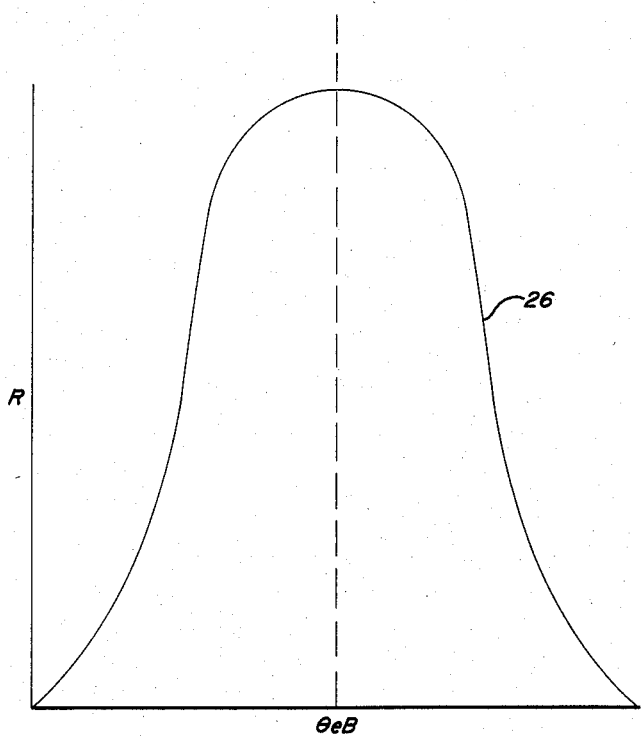

To select the d spacing for Mg K$\alpha$ radiation (9.89 Å), for example, the product of curves 22 and 24 is taken which results in a curve 26 illustrated in FIG. 2C. The maximum value of the curve 26 defines the optimum angle $\theta_{eB}$ for an infinitesimal focusing surface of the ellipsoid. For a coating having alternating layers of W and Si the d spacing is 22.5 Å. All wavelengths which are substantially above $\theta_{eB}$ will not be reflected, i.e., the reflectivity R is zero. For this example, $\theta_{eB}$ is 12.7°. Once the infinitesimal focusing section at $\theta_{eB}$ is defined by the procedure illustrated in FIGS. 2A–2C, then the collected flux contribution of finite segmental lengths of the ellipsoid must be determined as illustrated in FIG. 2D and described hereafter. Without this further analysis one would be led to select a finite focusing section centered around the equitorial angle, which is not the most effective flux collecting section.

A point source 28 is selected, of a size depending upon the application and then a finite segment length is chosen and the same segment length is moved along an ellipsoid surface 30 (only a portion of which is illustrated) about the median angle of 12.7°. The location of the point source 28 and a focus point 32 are defined by the foci of the ellipse. A 300 mm distance from the point source 28 to the focus point 32 was chosen. The flux contribution of two equal length finite segments 34 and 36 are illustrated by a flux contribution curve 38. The flux curve 38 represents the rate of change of flux $$\left(\frac{d\phi}{dx}\right)$$

collected by a perfectly reflecting ellipsoid surface. The curve 38 is determined without taking into account the effect of the layered coating. If the surface 30 was flat and included an appropriate layered coating, then a curve of flux collected vs. angle would result, similar to FIG. 2C.

Figure 2E:
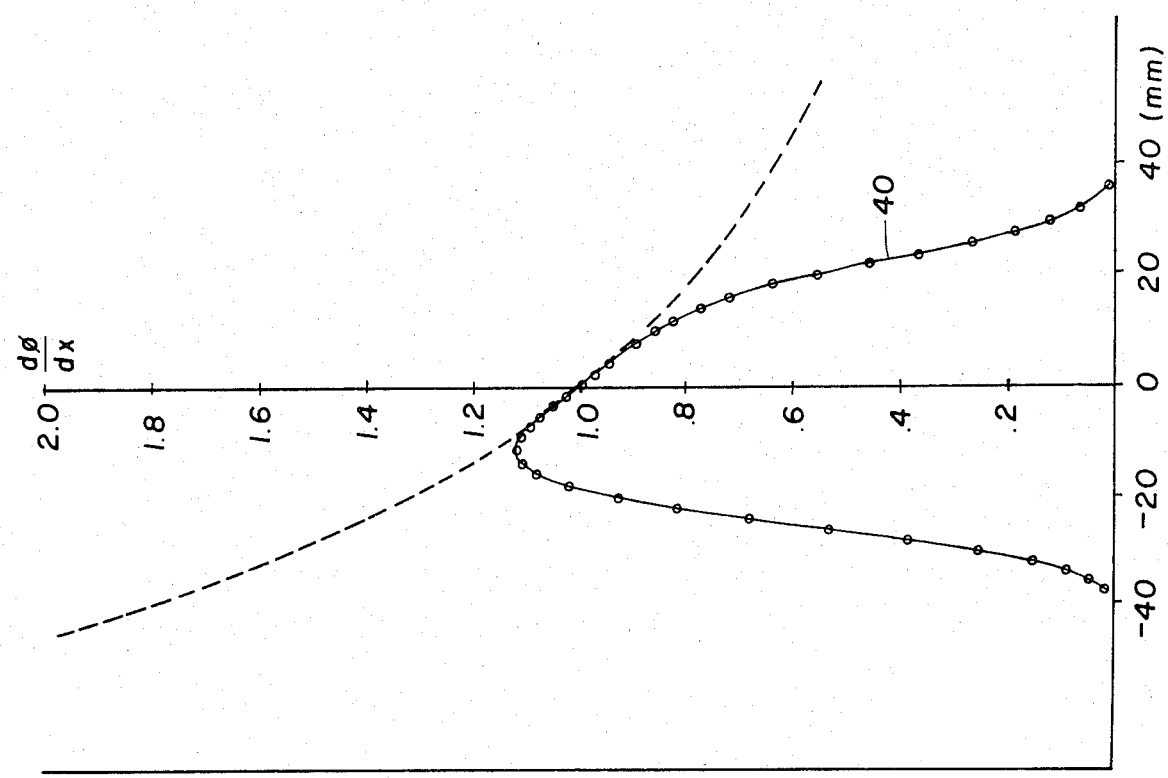
Figure 2D:
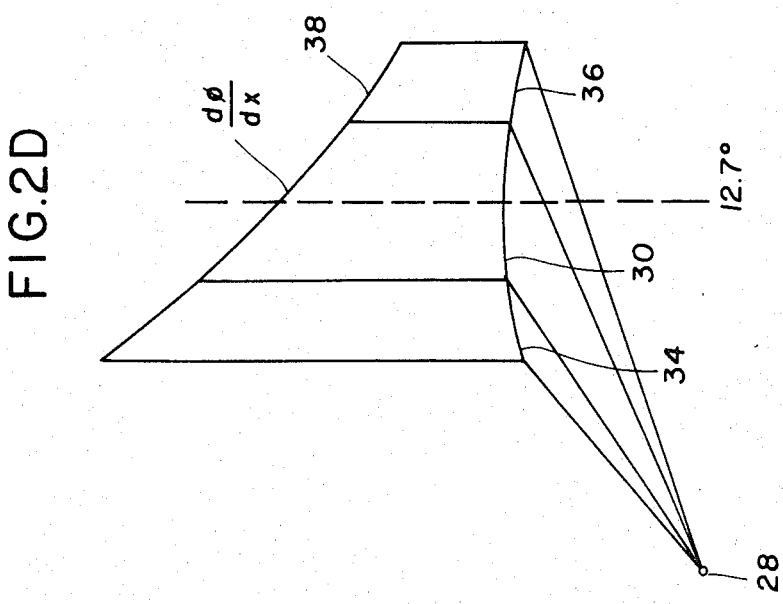

Since, however, the coated surface 30 is an ellipsoid whose equitorial angle has been chosen to equal $\theta_{eB}$ with peak reflectance for Mg K$\alpha$, a curve 40 results as illustrated in FIG. 2E. The curve 40 is the product of the substantially bell shaped flat coating curve (not illustrated) and the flux curve 38. The curve 40 represents the rate of change of flux $$\left(\frac{d\phi}{dx}\right)$$

collected by a coated reflecting ellipsoid surface in which the peak reflectance is 100% and whose peak reflectance angle coincides with the ellipsoid equator.

Figure 2G:
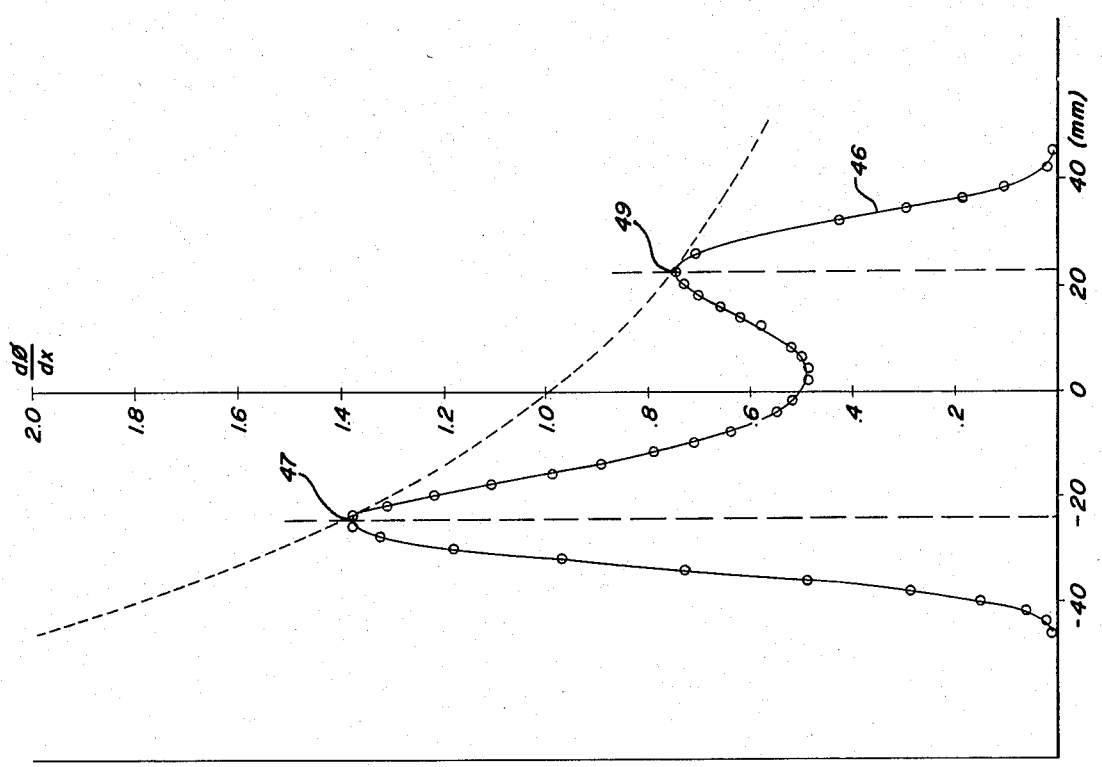
Figure 2F:
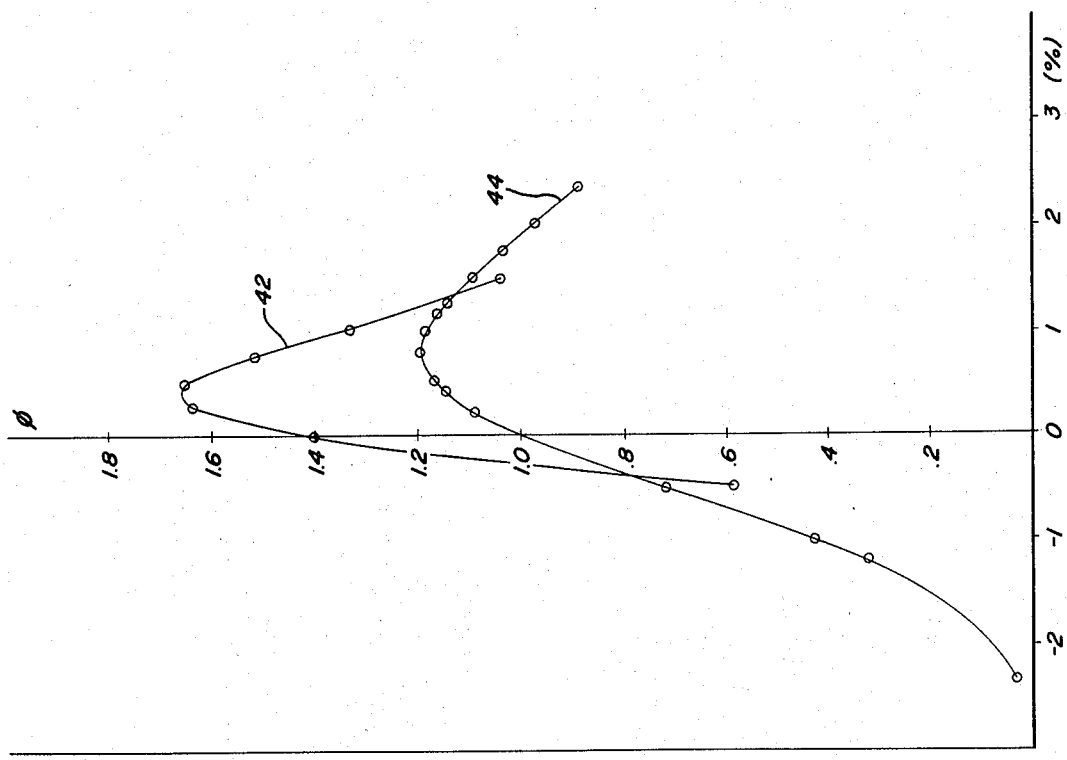

The effect of a shift of the angle of the peak reflectance to one side of the equitorial plane was then determined as illustrated in FIG. 2F. The flux resulting as a function of shift for a coating curve with a 0.5% width at half intensity is shown by a curve 42 and for a coating curve with a 1% width is shown by a curve 44. This illustrates the tuning to a particular wavelength which can be achieved by the layered coatings. However, in some cases to broaden the effective collected solid angle of the device, the layer coating can be graded through the structure to substantially retain the reflectance peak of the curve while increasing the width at the half intensity point. The width of the half intensity point can also be increased by decreasing the number of layer pairs at some loss in peak intensity. The layer coating can be graded across the structure to provide a high peak reflectance for the characteristic wavelength of interest at different positions on the surface of the ellipsoid by compensating for the change in incident angle at different points on the reflecting surface. Therefore, a slight shift in angle will not result in as large a magnitude decrease in reflectance as illustrated by coating curve 42.

A total length along the coated ellipsoid of 200 mm was analyzed, 100 mm on each side of the equitorial plane. This gave a total collected flux curve 46 as illustrated by FIG. 2G. The curve 46 represents the curve 40 as the peak reflectance angle increases which expands and develops peaks 47 and 49 and a trough near the equitorial plane of the ellipsoid. The total effective length of an ellipsoidal section which would effectively collect all the flux is slightly over 80 mm in length. Therefore, for this example, the total focusing element length would be 80 mm if manufacturing considerations were ignored. As a practical manufacturing consideration, a section length of 30 mm was selected. This is merely for practical ease in manufacturing the focusing element, since it facilitates coating of the element. This length was shifted along the length of the curve 46. It was determined that the maximum flux was collected for a section positioned with 27 mm on the source side of the equitorial angle and 3 mm on the focus side of the angle. As an alternate selection, the whole section was shifted to end 2 mm on the source side of the equitorial angle. This decreases the total reflected intensity only slightly, approximately 2% from the maximum attainable, as defined above. This can further facilitate the manufacturing of the focusing element and replication where desired as discussed with respect to FIG. 7.

Figure 4:
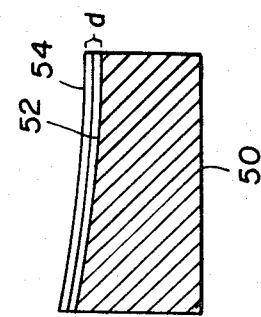
FIG. 4 is a side sectional view of one portion of the device of FIG. 3 illustrating the layer pairs formed thereon.
Figure 3A:
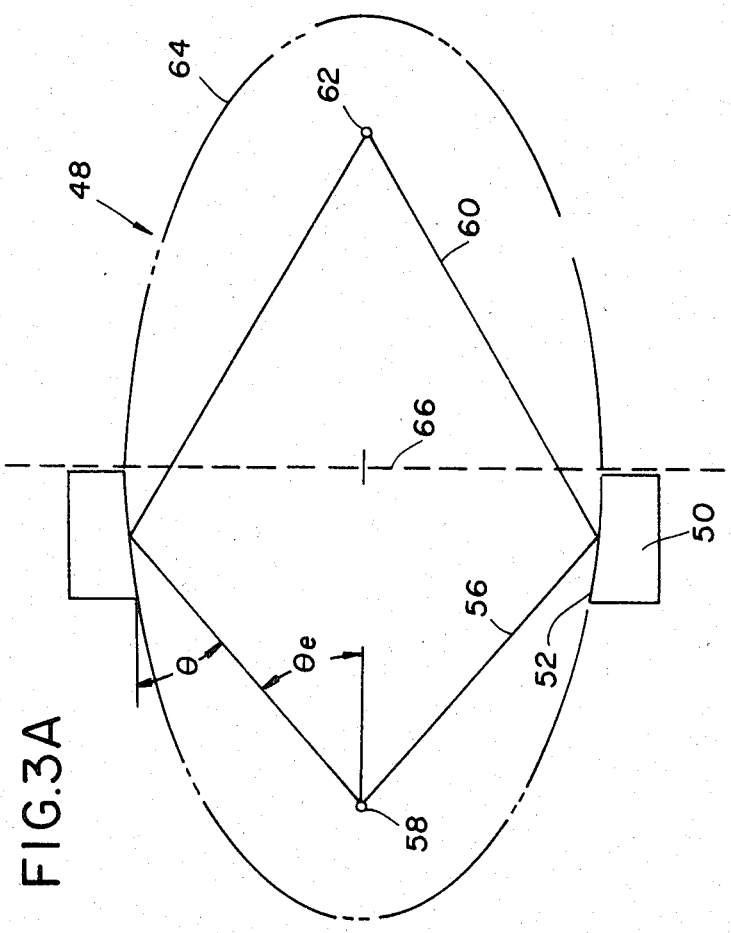
FIGS. 3A and 3B are partial sectional side views of one embodiment of the X-ray point source focusing device of the invention illustrating the X-ray focusing pattern.

FIG. 3A illustrates a first embodiment of a focusing device 48 of the invention. The device includes a focusing element 50 which has a focusing surface 52 chosen in accordance with the technique described with respect to FIGS. 2A-2G. The focusing surface 52 includes a plurality of layer pairs 54, only one pair of which is illustrated (FIG. 4). While only one layer pair 54 has been shown, having a single layer spacing d, typically many layer pairs are utilized for example on the order of 100–2000. The layer pairs also can have a graded d spacing as previously described. An incident X-ray beam 56 from a source 58 is made up of a band of wavelengths, $\lambda$ being an example of one wavelength. A reflected beam 60 is made up of a substantially single wavelength $\lambda'$ reflected at angle $\theta$, approximately according to Bragg's law $n\lambda' = 2d \sin \theta$. This condition is also satisfied for all subharmonics of $\lambda'$, i.e. $\lambda'/2$, $\lambda'/3$ ... $\lambda'/n$. Therefore, the reflected beam 60 contains all of these wavelengths in proportion to both their intensity in the incident light beam 56 and the magnitude of the higher orders of reflection which result from the rectangular electron density distribution, provided by the layer pairs 54. Each layer pair contributes to the reflected beam intensity at a like angle. (A full theoretical treatment results in a modification of Bragg's law resulting from refraction of the X-ray beam.)

Although not illustrated in FIG. 3A, a beam dump would typically be utilized to prevent axial X-rays from impinging on a focus point 62. The beam dump can be any conventional X-ray absorber, i.e. opaque to X-rays, such as a lead disc, which prevents X-rays from directly impinging on the focus point 62 along the optic axis from the source 58 to the focus point 62. The focusing surface 52 is a portion of an ellipse 64 shown in phantom. The ellipse 64 is centered about the source 58 and the focus point 62 which define the foci of the ellipse 64. The ellipse 64 has a center line or plane 66 which also defines the equitorial angle $\theta_e$. It could be assumed that the section 50 would be centered around the center plane 66, however, this is not the actual case as was described above. The section 50 is shifted toward the source 58 and, for example only, is illustrated shifted totally to the source side of the center line 66 essentially in the alternate position.

Figure 3B:
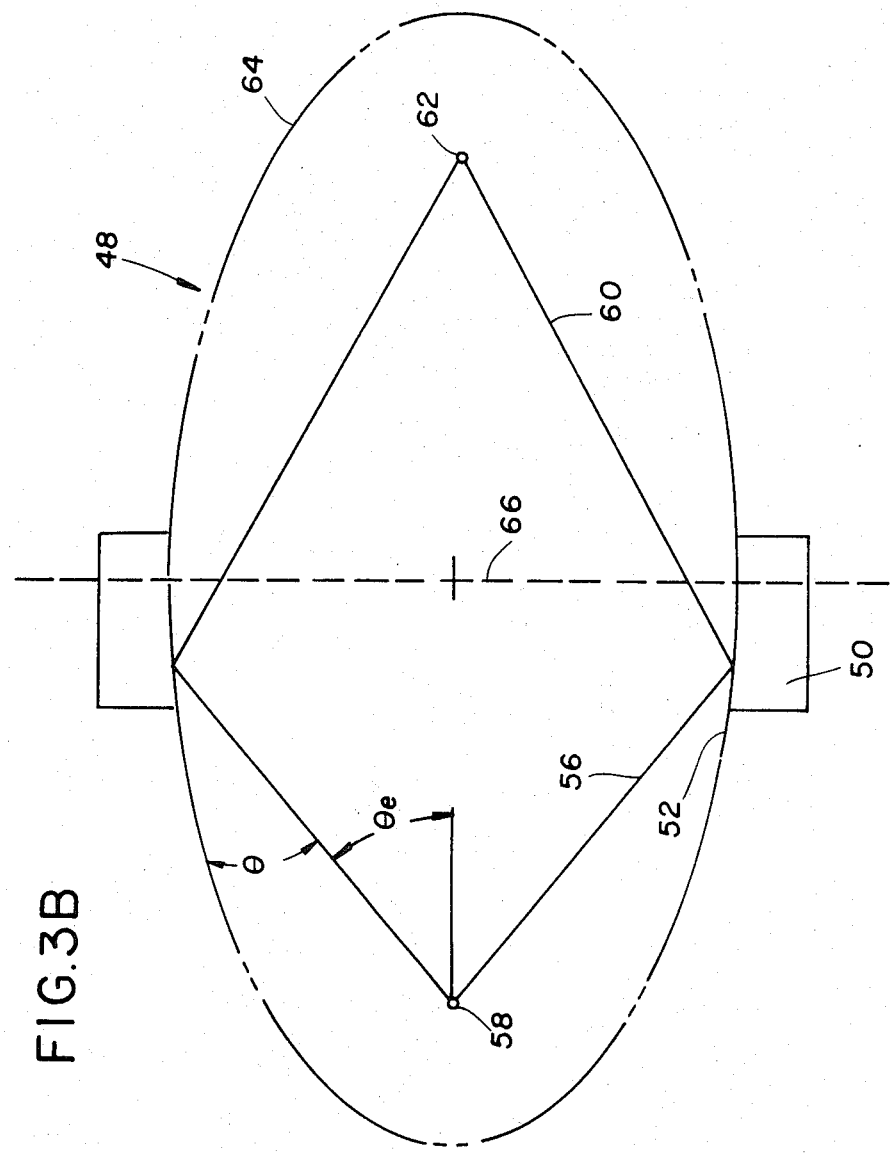

FIG. 3B is a partial sectional view of an embodiment of a focusing device 48 of the invention which is substantially similar to that illustrated in FIG. 3A except focusing element 50 is not shifted totally to the source side of center line 66. In FIG. 3B, as an alternative embodiment, focusing element 50 is shown shifted predominately, rather than totally, to the source side of center line 66.

Figure 5:
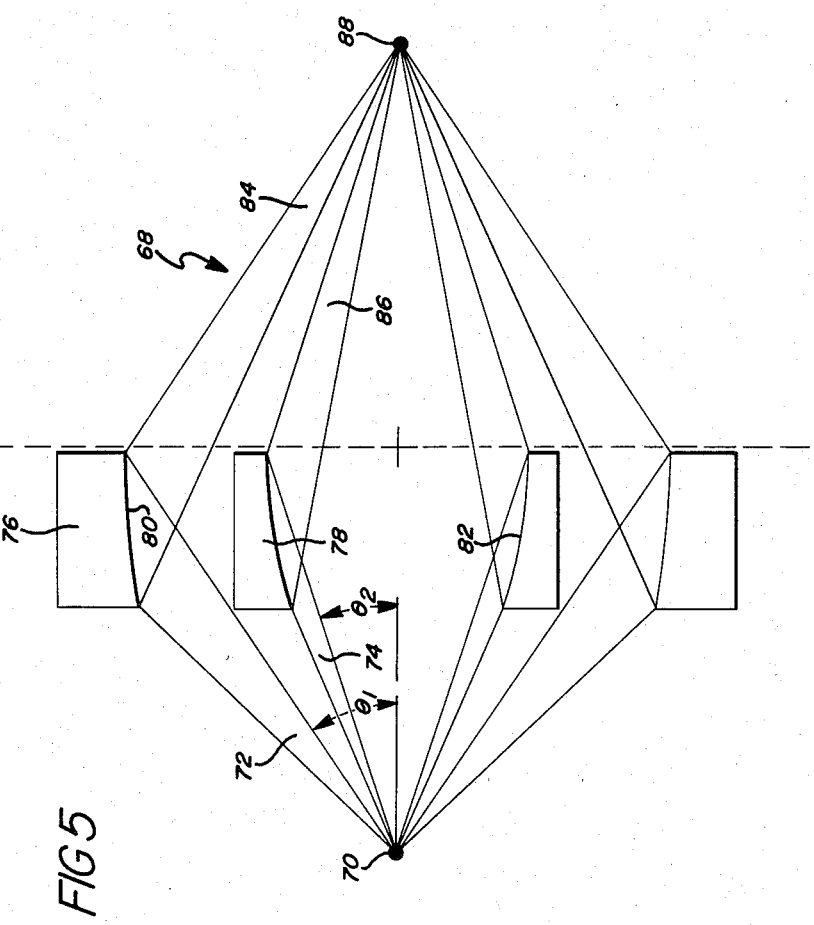
FIG. 5 is a partial sectional side view of a second embodiment of point source focusing device of the invention.

Referring now to FIG. 5, a second embodiment of a point source focusing device 68 of the invention is best illustrated. A source 70 has a pair of conical incident beams 72 and 74 which are reflected by a respective one of a pair of focusing elements 76 and 78. Each of the focusing elements 76 and 78 has a respective focusing surface 80 and 82 which each reflects a respective beam 84 and 86 to a focus point 88. Adding the second element 78 or further elements, increases the solid angle and hence, the total reflected X-ray intensity collected at the focus point 88. The d spacing of the layer pairs on the surface 80 is designed for angle $\theta_1$, and the d spacing on the surface 82 is designed for angle $\theta_2$.

Figure 6:
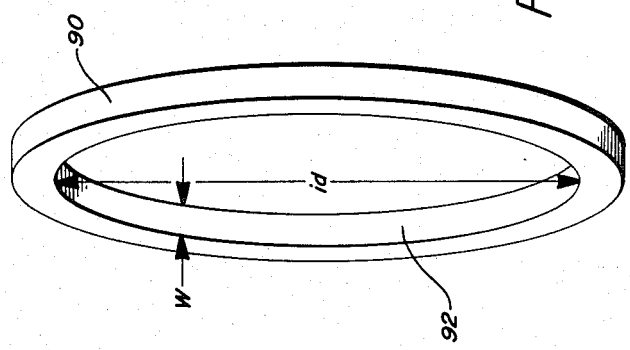
FIG. 6 is a perspective view of the embodiment of FIG. 3.

FIG. 6 is a perspective view of a single focusing element 90 which has a focusing surface 92. The element or section 90 is designed as defined above for a specific width or element length "w" and has an inner diameter "id" in accordance with the ellipsoid chosen by the foci of 300 mm and the angle $\theta_e$. The sections conveniently are formed of Al, Be or stainless steel which are diamond turned or conventionally machined and preferably are plated with electroless Ni and then polished. The sections could be formed of glass or other rigid substrate material. The layer pairs such as Hf:Si or W:Si are typically formed in accordance with the methods described in the above referenced application Ser. No. 501,659.

Figure 7:
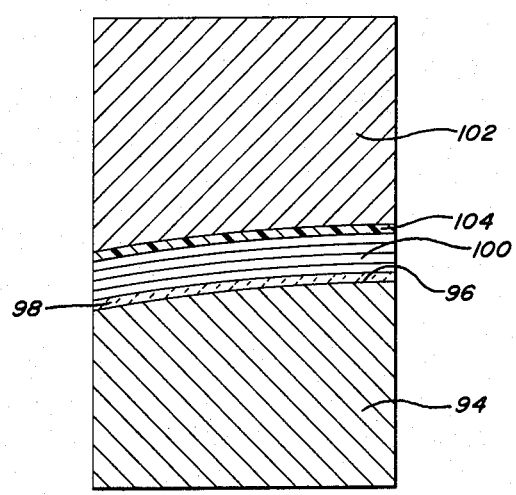
FIG. 7 is a side sectional view of a replicating method of manufacturing the device of FIG. 3.

FIG. 7 illustrates a replication method of forming the focusing element 50 of the invention. A male section 94 is formed having a surface 96 which is a reverse or mirror image surface of the focusing surface 52 of the focusing element 50. A release coating 98 is then formed on the surface 96. A plurality of layer pairs 100 like the pairs 54, for example, are then formed on the release coating 98. A substrate 102 is then secured to the layer pairs 100 by a hardening filler 104, such as an epoxy type glue. The release coating 98 is then removed from the male section 94 and removed from the layer pairs 100 to replicate the element 50 and focusing surface 52 with the layer pairs 54 thereon. The male section 94 can be formed in one or more sections to facilitate removal of the release coating 98 of the structure formed thereon. The section 94 can then be utilized to form another focusing element. If the section 94 was formed for a focusing element 50 which includes the equitorial plane 66, the section 94 would have to be formed in pieces to remove the replicated section.

Figure 8:
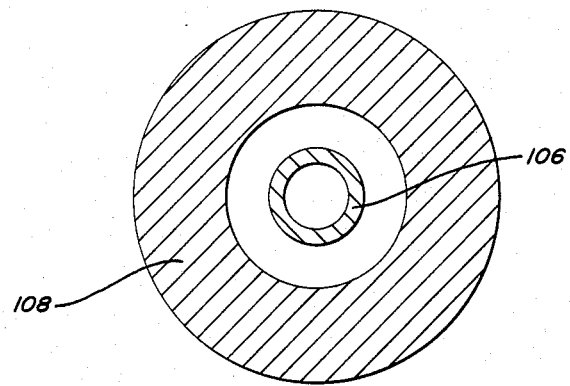
FIG. 8 is a diagrammatical representation of the solid angle intersected by the prior art system of FIG. 1 and by the embodiment of FIG. 3 of the invention.

FIG. 8 is a graphic illustration, not totally proportional which illustrates the significant difference in solid angle and hence total collected flux intensity between a prior art cone solid angle 106 and a focusing element solid angle 108 of the present invention.

Referring to FIG. 9, there is shown a diagrammatical representation of a conventional X-ray analysis system 210. The system 210 includes an X-ray source 212 which directs a beam of X-rays 214 at a sample 216. A beam 218 of fluorescent radiation is emitted by the sample 216 which is aligned to pass through an aperture 220 onto an X-ray dispersive structure 222 which reflects a beam 218' to a detector 224. The curvature of the structure 222 is exaggerated, but it is slightly curved to focus the desired wavelengths of the reflected beam 218' onto the detector 224.

FIG. 10 shows the dispersion pattern of a typical prior art layered structure 222. While only three layer pairs have been shown, having a layer spacing d, typically many layer pairs are utilized for example on the order of 100–2000. The incident beam 218 is made up of a band of wavelengths, $\lambda$ being an example of one wavelength. The reflected beam 218' is made up of a substantially single wavelength $\lambda$ reflected at angle $\theta$, approximately according to Bragg's law $n\lambda' = 2d \sin \theta$. This condition is also satisfied for all subharmonics of $\lambda'$, i.e. $\lambda'/2, \lambda'/3 \ldots \lambda'/n$. Therefore, the reflected beam 218' contains all of these wavelengths in proportion to both their intensity in the incident beam and the magnitude of the higher orders of reflection which result from the rectangular electron density distribution, as illustrated in FIG. 10. $I_i(\lambda)$ is the incident intensity distribution of $\lambda$ and $I_r(\lambda')$ is the reflected intensity distribution of $\lambda'$. (A full theoretical treatment resuls in a modification of Bragg's law resulting from refraction of the X-ray beam.)

Each layer pair contributes to the reflected beam intensity at a like angle. The reflection from only one layer pair is illustrated. The structure 222 generally is curved to focus the reflected wavelength of interest from each layer pair onto the detector 224. The structure 222 is formed from a plurality of layers, each layer of which includes a pair of different material layers A and B which is intended to have an abrupt junction between each layer. Functionally, this means there essentially is a square wave density of reflection index 226 which intercepts the beam 218.

Figure 11:
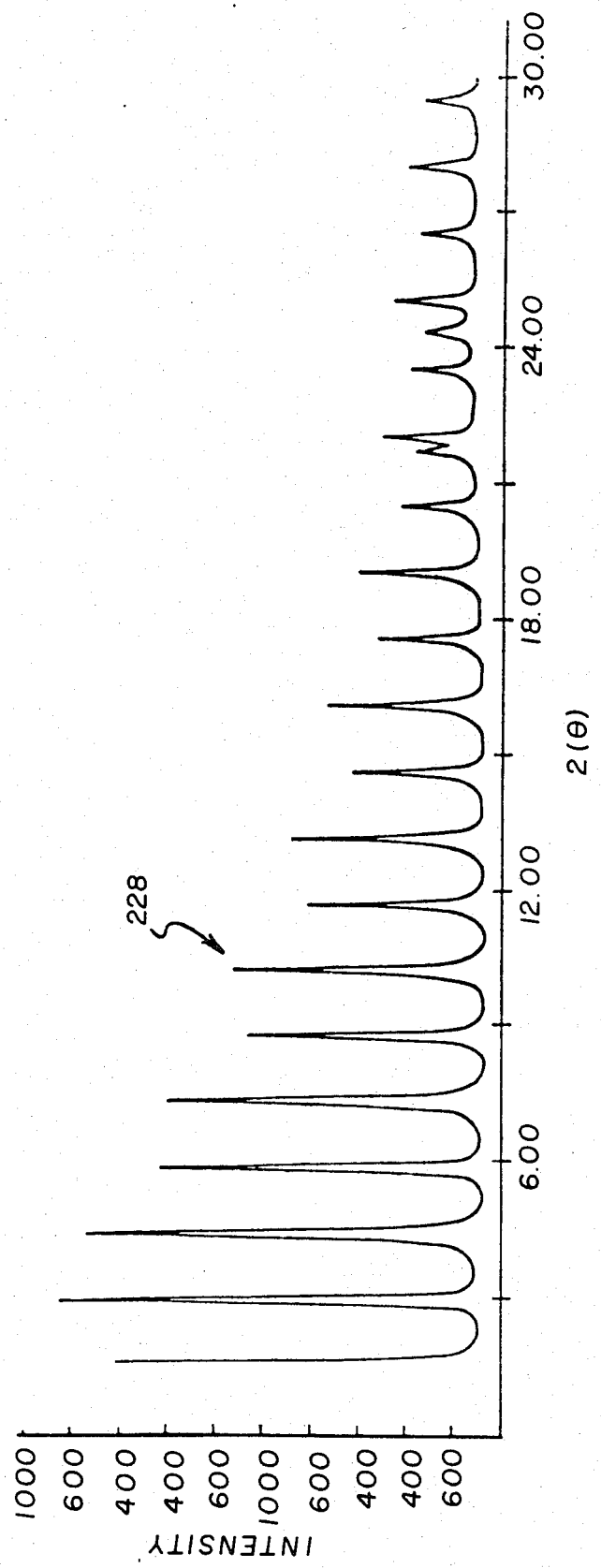
FIG. 11 is a diffraction pattern generated by the prior art structure of FIG. 10.

FIG. 11 illustrates a diffraction pattern 228 caused by the incident beam 218 impinging on a prior art LB X-ray dispersive structure. Each of the peaks is an order of reflection, n, for the wavelength $\lambda'$ (the wavelength of interest) as derived according to the approximate relationship $n\lambda' = 2d \sin \theta_n$. The prior art lsm devices exhibit similar diffraction patterns, which essentially are controlled by the materials deposited and the d spacings utilized. It would be desirable to control the diffraction pattern, by more precise control of the layered structures and to eliminate any fluorescence and absorption edges in the X-ray range of interest as described later.

Also, it can be desirable to reflect all the incoming beam energy at wavelength $\lambda$ at a single angle. This would substantially increase the intensity of the reflected wavelengths at each corresponding angle and simplify the analysis of the diffracted beam and hence the chemical composition of the sample. Another application is for monochromators.

Figure 12:
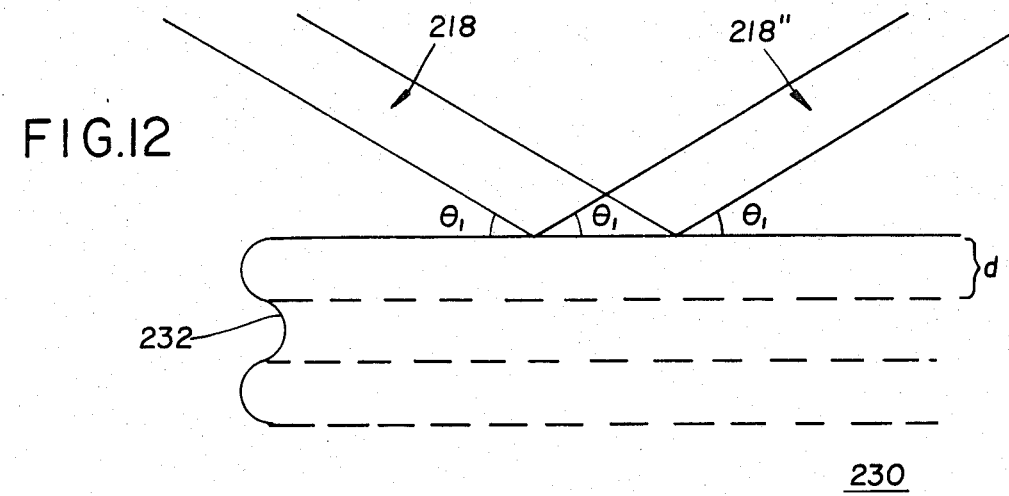
FIG. 12 is an exploded partial sectional view of one embodiment of the X-ray dispersive structure of the invention illustrating the X-ray diffraction pattern.

FIG. 12 illustrates one desired diffracted beam pattern 218" from a dispersive structure 230 of the invention which reflects all the incident beam energy of a particular wavelength at separate angles, for example $\lambda$, at $\theta_1$. All different wavelengths including subharmonics of the wavelength of interest would be reflected at different angles. The structure 230 is formed by the techniques described below, to result in a substantially continuously varying electron density or refractive index 232. A sinusoidal refractive index is necessary to produce a single diffraction angle for each incident wavelength. Although a d spacing is also shown here, the materials such as C and D are materials whose compositions vary essentially sinusoidally in composition throughout the structure, such as amorphous alloys. This sinusoidal variation of the maximum electron density contrast through the structure 230 produces a structure with the greatest percentage of radiation in the first order reflection.

Figure 13:
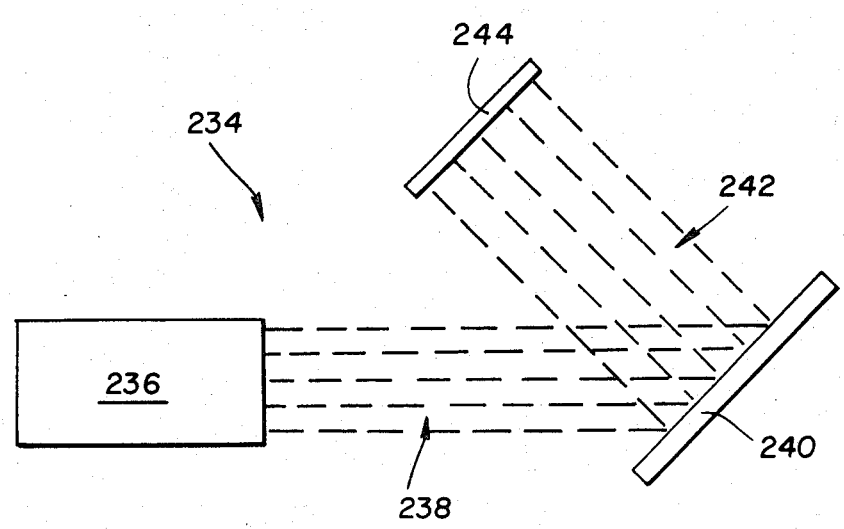
FIG. 13 is a partial side view diagrammatical representation of one embodiment of ion beam deposition technique of the invention.
Figure 14:
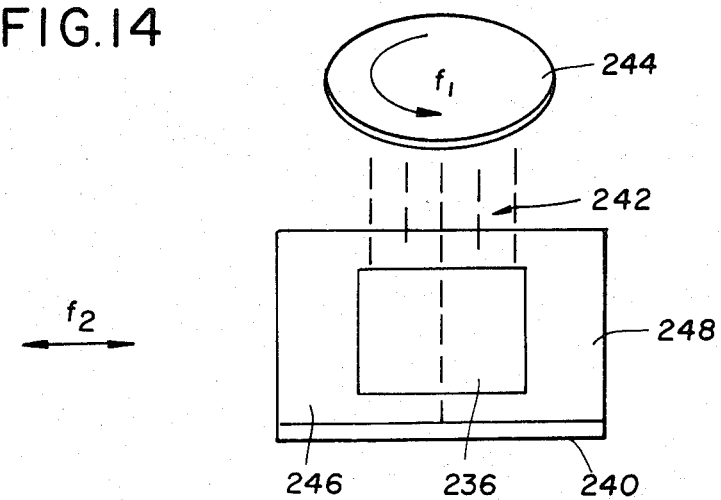
FIG. 14 is a partial end view diagrammatical representation of the technique of FIG. 13.

In order to control the exact composition and microstructure as a function of thickness through the dispersive structures 230, it is necessary to control the magnitude of the kinetic energy of the deposited atoms and their incident momenta. These deposition parameters are best controlled by depositing the materials in an ion beam system to accurately control the average electron density as a function of position throughout the structure. One embodiment of a suitable ion beam system 234 is illustrated in FIGS. 13 and 14.

Ion beam techniques have not been utilized to deposit prior X-ray dispersive and reflective structures, but the techniques as adapted by the invention are desirable due to their precision and control of the deposition parameters as well as the decoupling of the ion plasma from the substrate and minimization of undesirable components in depositing the desired structure. An ion source or gun 236 generates a beam of ions 238 which are neutralized and directed at a suitable target 240. The beam 238 sputters material from the target 240 into a substantially collimated and uniform stream 242 which is deposited on a suitable substrate 244. The substrate 244 can be mounted on a holder (not shown) and the system 234 is under vacuum which can be substantially lower than that utilized in magnetron or diode sputtering. The substrate 244 also can be heated or cooled as desired to affect the structure of the material deposited as described hereinafter.

Because of the precision of the ion beam system 234, the layers can be produced with a smoothness below 1.4 Å. One structure was formed of 30 layer pairs of W and C with a d spacing of 33.5 Å and a nominal composition of $W_{50}C_{50}$. The rms roughness $\Delta d$ (or smoothness) was 0.93 Å as defined by:

$$\frac{I_r}{I_i} = \frac{(I_r) e^{-(4\pi n \Delta d/d)^2}}{(I_i) \text{ideal}}$$

The precision and smoothness of the layer interfaces directly affects the reflection pattern. The structure was deposited at room temperature, at a pressure of $1 \times 10^{-4}$ torr, with argon flowing into the gun 236 at 2.8 sccm and the density of the beam 238 at 10 ma/cm². The best reported rms roughness for a prior art lsm structure is for W:C and is about 1.4 Å.

As best illustrated in FIG. 14, the ion source or gun 236 preferably is a square cross section source which generates a substantially square section beam 238. The substrate 244 preferably is rotated at a frequency $f_1$, to ensure an even deposition across the substrate 244, preferably in the range of 10-20 rpm. The target 240 is divided into two sections 246 and 248, each formed from a different material, C and D as described above. To form the rectangular electron density structures, the source can be turned off while the target is translated or it can be shuttered to effect the complete separation of the material layers. While, the source 236 and substrate 244 could be oscillated back and forth in a controlled manner to generate the continuously varying index of refraction 232, preferably the target is oscillated in front of the beam 238 at a frequency $f_2$. As utilized herein, frequency is defined as a prescribed rate of repetitions of relative orientations and is not limited to sinusoidal repetitions.

The frequency $f_1$ preferably is much greater than frequency $f_2$, for example on the order of 100 times $f_1$.

For different materials and structures $f_1$ and $f_2$ will be different and section 246 might be passed in front of the beam 238 at a different rate or with a different beam power than section 248. Further, the sections 246 and 248 can be separate targets and there can be more than two sections, which also can be controlled by shutters (not shown) if desired.

The materials on the target 248 can be in more than two sections and, for example, can be four sections which can be deposited in two sets of layer pairs, A and B and C and D. The two sets can be selected such that two different wavelengths of interest, $\lambda_1$ and $\lambda_2$, are both reflected at the same angle to the detector 224 or to different detectors. Single element materials, compounds, alloys or combinations thereof can be utilized.

Figure 15:
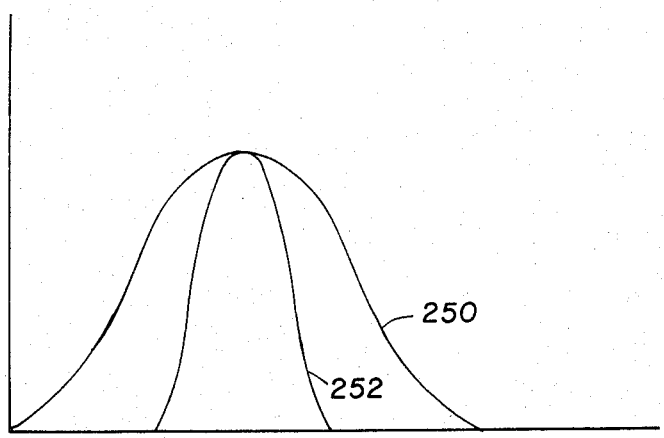
FIG. 15 is a diagram of reflected wavelength resolution.

FIG. 15 is a diagram illustrating the reflected wavelength resolution. The more narrow the bandwidth, the more resolution is obtained from the reflected signal, hence a reflected bandwidth 250 has much less resolution than the same reflected signal with a bandwidth 252. The precision of the system 234 can result in a much more narrow reflected bandwidth than the prior lsm type of X-ray structures 222.

Figure 16:
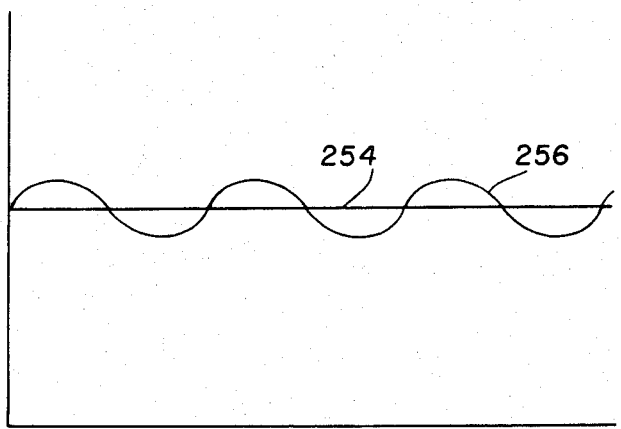
FIG. 16 is a diagram of controlled bandwidth of the reflected signal.

FIG. 16 illustrates another advantage of the deposition techniques of the present invention. Since amorphous materials are not limited to any one structure, utilizing the deposition techniques of the invention the maximum and minimum electron density contrast for each layer can be varied as desired. In the prior lsm structures 222, material A is alternated with material B, and hence the electron density is limited to a pseudorectangular distribution. Further, a maximum reflectivity 254 can be chosen with a minimum deviation 256 of reflected bandwidths around the maximum 254.

Figure 17:
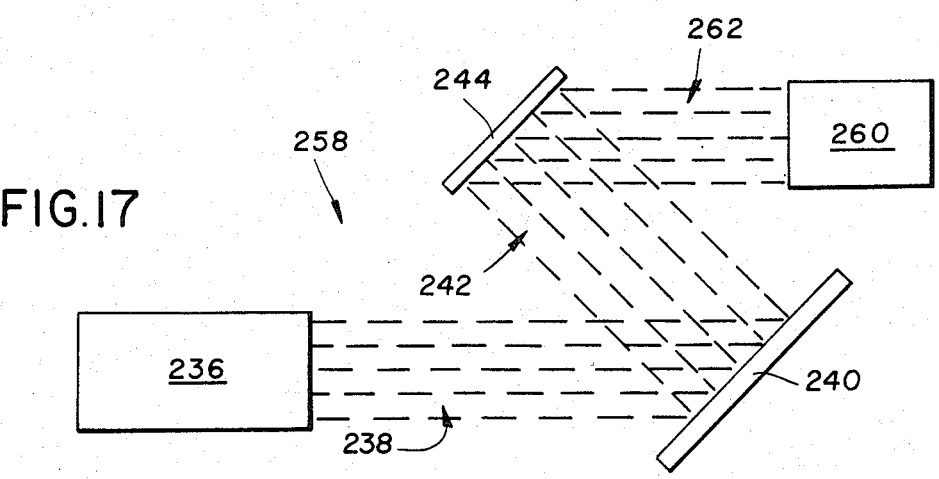
FIG. 17 is a partial diagrammatical representation of a second embodiment of the ion beam deposition technique of the invention.

FIG. 17 illustrates a second ion beam system 258, which can be identical to the system 234 with the addition of a second ion beam source 260. The ion beam source 260 generates an ion beam 262 which can be a reactive ion beam formed from argon and/or nitrogen or other suitable materials and combinations thereof. A reactive ion beam can be utilized to control the density of the materials in a selected layer or layers or in all layers. The substrate 244 is again rotated at a speed $f_1$ and the target 240 is oscillated in front of the beam 238 at a frequency $f_2$. The current of the reactive beam 262 can be controlled at a third frequency $f_3$ to modulate and assist in the deposition of the material onto the substrate 244. The ion current of the ion source 236 also can be varied at a fourth frequency $f_4$, to provide a further control of the deposition process.

Figure 18:
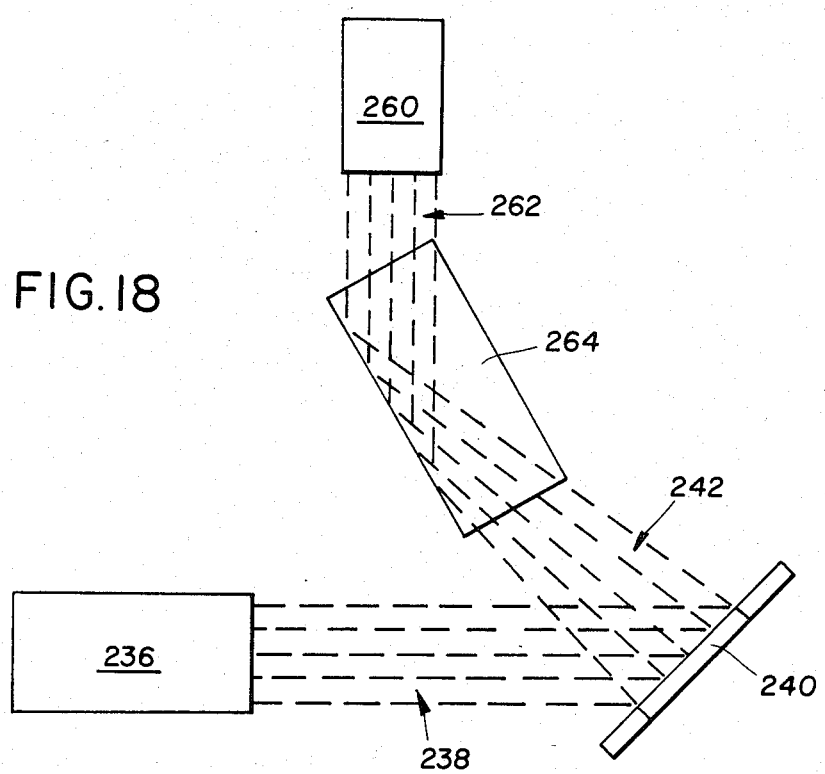
FIG. 18 is a partial diagrammatical representation of the techniques of FIGS. 13 and 17 utilized to deposit on a cylindrical surface.

The deposition systems of the invention can also be utilized to deposit the dispersive or reflective structures onto the inside of a substantially curved or cylindrical substrate 264, as illustrated in FIG. 18. The substrate 264 can be coated by the stream 242 or by both the beam 262 and stream 242. The reactive source alignment is not crucial and the source 260 can also be aligned to enter the cylinder from the same direction as the stream 242. The substrate 264 would again be rotated at a frequency $f_1$ to provide a uniform deposition and the frequency of the target 240 is selected as previously described.

Figure 19:
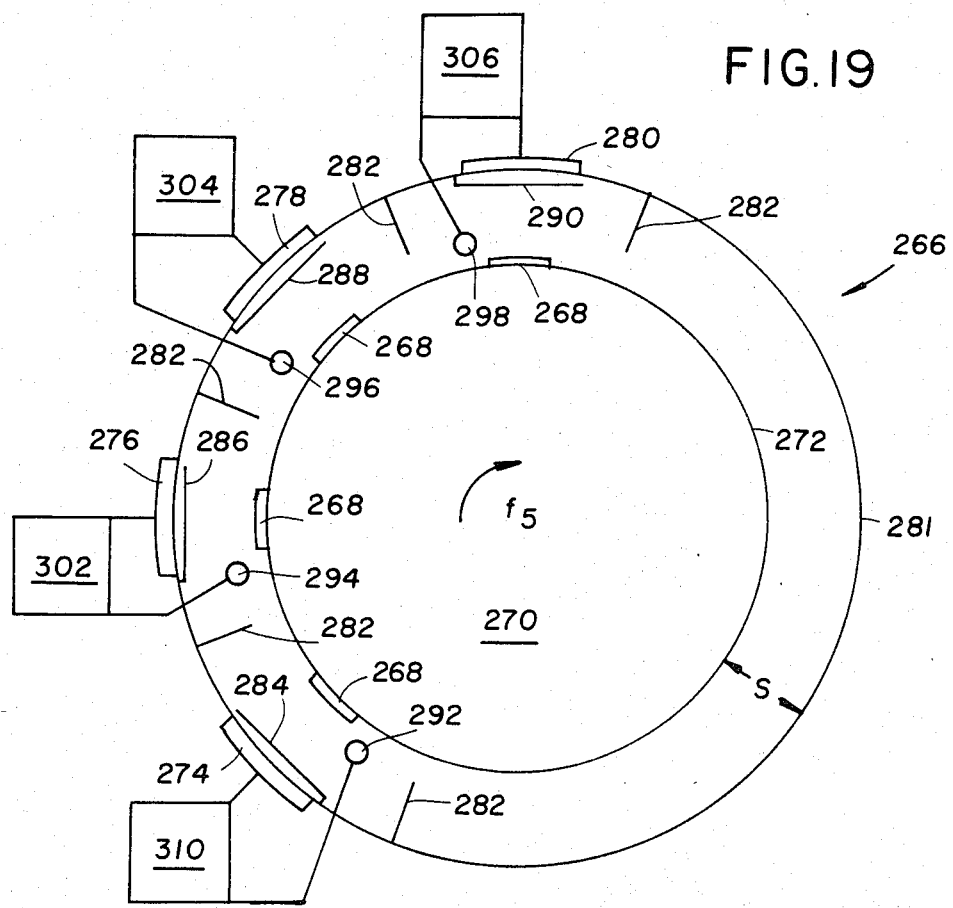
FIG. 19 is a partial diagrammatical representation of a third deposition technique embodiment of the invention.

A third type of deposition system 266 is illustrated in FIG. 19. The system 266 is a magnetron sputtering deposition system which confines the plasma to the vicinity of a plurality of target 274, 276, 278 and 280 separated from a plurality of substrates 268 fixed to a rotating drum 270. The outer surface of the drum 270 also could be utilized as a substrate 272 if desired. The drum 270 can be heated or cooled as desired and is rotated at a frequency $f_5$ to pass the substrate 268 past a plurality of targets 274, 276, 278 and 280 mounted on a shell 281 of the system.

Each target 274, 276, 278 and 280 is isolated by a variable height isolation shield 282. Each target 274, 276, 278 and 280 has associated therewith a shutter 284, 286, 288 and 290, a deposition rate monitor 292, 294, 296 and 298 which is coupled to a respective power supply 300, 302, 304 and 306. Each target thus has its own power supply, shutter and deposition monitor to provide a control loop at each deposition station. Although four stations have been illustrated, more or less can also be provided.

The space "S" between the drum surface 272 and shell 280 is varied to control the impact of the secondary electrons on the substrate to maximize the decoupling of the magnetron confined plasma from the substrates to provide a more uniform and controlled deposition. The system 266 is operated under vacuum with a sputtering gas such as argon. In addition, a reactive gas, such as hydrogen or a compound containing hydrogen, can be injected into the plasma adjacent the target for the effects described above. The system can make many substantially identical modulated structures on the plurality of substrates 268 or can make a single structure on the cylinder 272.

The present invention also includes the choice of the most appropriate materials which can take full advantage of the improved synthesis techniques above described. It has been previously known that the reflectivity properties of lsm devices can be controlled by controlling the electron density as a function of depth in the lsm device. For example, to obtain the maximum reflectivity it is known that the constituents should be chosen with the maximum electron density differences between the layers. Hence the dominant choice in the prior art lsm devices has been W:C or W-Re:C layers.

Additional factors which are important in achieving the maximum control over the composition gradients in the structures of the present invention are relative electronegativities, atomic diameters and bond lengths. The smaller difference in electronegativities means that there is less of a tendency for these materials to react when they are placed by deposition processes into adjacent layers. It is for these reasons that the materials that have the smallest electronegativity difference and the greatest electron density difference should be utilized to synthesize structures with the highest peak reflectivity. From a geometric point of view, the greater the similarity between atomic sizes and bond lengths the more effectively these materials can be mixed and layered in a prescribed fashion.

We observe that in the prior art lsm structures constructed from tungsten and carbon, the Pauling electronegativities are 1.7 and 2.5, respectively. Additionally, the covalent radii are 1.3 and 0.77 Å and the bond lengths are 2.74 and 1.54 Å, respectively. It has been published that the tungsten carbon prior structures when deposited by sputtering do not layer as tungsten and carbon, but rather as tungsten carbide and carbon.

The chemical reactions which occur at the interfaces between the W and C constituents are partially controlled by these chemical and physical mismatches and thereby make difficult the construction of perfectly controlled interfaces.

To synthesize structures with the maximum precision the materials of the invention have been chosen so that there is a minimum electronegativity difference between the species involved and the closest similarity in covalent radii and the minimum distance in bond length (including the M—M bond lengths, non-M and non-M bond lengths and non-M and M bond lengths). The Pauling electronegativities for Hf and Si materials are 1.3 and 1.8, respectively for the metal and the nonmetal. In addition to being concerned about how well the layering and maximizing the electron density contrast can be controlled, it is also necessary that the materials that are used not have spurious fluorescences which would reduce the signal to noise ratios in spectroscopic applications. When this fact is also included in the requirements for a material to be a reflecting/dispersive element, the most correct pairs of materials are hafnium-silicon, rhenium:silicon or Hf-Re:Si for the wavelength range of 9.75 Å to 120 Å. Utilizing the concepts of the invention in the magnetron sputtering system, a structure formed from layers of Hf and Si was deposited which had a d spacing of 7.85 Å. The layers were deposited at room temperature with 2 microns background pressure in argon.

As stated above, the other features which are important in controlling the quality of the layered structures include the atomic diameters of the materials and the bond lengths of the separate elements between themselves. Using the criterion that the atomic size and the bond lengths of the high and low electron density materials be as similar as possible results in the choice of silicon as the nonmetal and Hf, Re or Hf-Re alloys as the higher electron density materials in the layered structures for use in the soft X-ray range. The bond lengths of Hf and Si are 3.13 and 2.35 Å, respectively. The covalent radii of hafnium, rhenium and silicon are 1.44 Å, 1.28 Å and 1.11 Å, respectively.

The other nonmetals which might be considered are carbon, boron, and beryllium. All of these elements have bond lengths of about 1.5 Å. Thus these alternative light elements would cause a very large mismatch in atomic sizes and bond lengths at the interfaces making optimum control of the structure more difficult. As stated before the electronegativities of boron and carbon are greater than those of the optimum metals, thus destabilizing the structures toward compound formation, and of course all of these light elements will fluoresce when used as soft X-ray spectrometers and mirrors.

Using these same principles, a material which would give optimum structures for highest resolution dispersive structures must be compatible from the chemical point of view and in addition have a small electron density contrast, as well as no substantial fluorescence. Aluminum-magnesium:silicon, Al:Si or Mg:Si, structures would be the most appropriate for the use as high resolution soft X-ray devices. The covalent radii for Al and Mg are 1.18 and 1.36 Å, the bond lengths are 2.86 and 3.19 Å and the Pauling electronegativities are 1.5 and 1.2, respectively.

For devices to be used in the harder X-ray region this same analysis must be carried out, but with different fluorescence limitations on the X-ray structures.

One example of a specific Langmuir-Blodgett X-ray film which can be replaced by the structures of the present invention is a Myristate film. The structure in accordance with the present invention was formed from 50 layer pairs of Hf and Si by magnetron sputtering at room temperature in argon with 2 microns background pressure. The nominal composition was about $Si_{60}Hf_{40}$. The comparison for O K$\alpha$ and N K$\alpha$ reflections are shown in Table 1.

TABLE 1

| Hf:Si Structure $I_p$ | Myristate $I_p$ |
|---|---|
| O 1.24 × 10$^5$ | 3.38 × 10$^4$ |
| N 1.16 × 10$^4$ | 2.36 × 10$^3$ |

The present structure was more than 3.6 times better than the Myristate for O K$\alpha$ and more than 4.9 times better than the Myristate for N K$\alpha$ detection. These measurements were made in a JEOL WDS Spectrometer by standard techniques under substantially identical operating conditions for each test. The Hf:Si structure had a d spacing of 42 Å and the Myristate had a d spacing of 40 Å. Part of the large difference is due to the lack of the C absorption edge in the Hf:Si structure. The Hf:Si structure exhibits a substantially constant reflectivity over the soft X-ray range of interest. The prior structures, both LB and lsm structures which include C, in contrast fall below one third of the theoretical intensity of the C absorption edge at approximately 43.7 Å. Significant changes in the reflection intensity have been observed by annealing the structures for times as short as one hour at 100° C.

The structures of the present invention also can be thermally activated to control various desired parameters in the resulting structures. An increase in first order reflectivities can be obtained by post annealing the structures. A Hf:Si structure was deposited in a magnetron sputtering system in argon with 2 micron background pressure at room temperature. The structure had a nominal composition of $Hf_{40}Si_{60}$, 100 layer pairs and a d spacing of 34.4 Å. The deposited structure was annealed at 200° C. for sixty-three hours which increased the reflection intensity ($I_r/I_i$) in the first three orders of reflection as shown in Table 2.

TABLE 2

|  | 1st order | 2nd order | 3rd order |
|---|---|---|---|
| As deposited | 70.5 | .40 | .06 |
| After annealing | 72.5 | .44 | .41 |

A second method of tuning the reflectivity is illustrated in Table 3. These were all Hf:Si structures deposited in the magnetron sputtering system under the same general conditions as previously described, with the exception that the substrate temperature was varied as described. The structures again had a nominal composition of $Hf_{40}Si_{60}$, 100 layer pairs and a d spacing of 38.8 Å.

TABLE 3

| Substrate Temperature | First Order Reflectivity |
|---|---|
| 50° C. | 53.7 |
| 100° C. | 75.7 |
| 200° C. | 70.0 |

Table 4 illustrates the use of thermal activation to decrease the first order reflection and to increase the second order reflection. This principle can be utilized for structures where the first order is reflected at too small an angle to be effective. The Hf:Si materials were deposited in the magnetron sputtering system under the previously described conditions at room temperature. Both structures had a nominal composition of $Hf_{40}Si_{60}$ and 100 layer pairs. The first had a deposited d spacing of 32.13 Å and the second a d spacing of 33.21 Å. The first structure was annealed at 300° C. for 1 hour and the second at 400° C. for 1 hour.

TABLE 4

|  |  | First Order | Second Order |
|---|---|---|---|
| #1 | Before Anneal | 77.8 | .28 |
|  | After Anneal | 13.8 | .60 |
| #2 | Before Anneal | 56.0 | .26 |
|  | After Anneal | 49.6 | 1.10 |

While the utilization in the layered structures of C, W and Be as well as other elements as major constituents, produce undesirable absorption edges and/or fluorescence, small amounts of the materials can be useful. The addition of small amounts of C, W or Be such as in Hf:Si-C structures or W-Re-Hf:Si-C structures can be useful, because reflectivity increases as the electron density difference increases. The C or Be would replace some of the Si while the W will replace some of the Re-Hf alloy. This can result in at least two desirable effects, one is an increase in intensity at wavelengths of interest away from the absorption or fluorescense edges and a second by increasing the overall stability of the structures.

Other material combinations can be formed within the scope of the invention, including alloy:alloy layer pairs, alloy:Si or alloy:Si:H layer pairs, Hf-Re:Si layer pairs or Hf-Re:Si-H alloy pairs. Also, the ion beam or sputtering flux can be profiled to control the uniformity of the deposited structure over the substrate area. This allows the construction of structures whose d spacing can be varied in a controlled fashion across the surface of the substrate and subsequent layers. The type of substrate is not critical and can include any prior lsm type of substrate, including polished silicon wafers, glass, metal, quartz, sapphire or flexible plastic.

Many modifications and variations of the present invention are possible in light of the above teachings. The layer pairs and the methods and materials forming them can be selected as desired above; however, those described with respect to Ser. No. 501,659 are preferred. The focusing elements and surfaces formed in accordance with the invention provide a substantial improvement in flux collected for any wavelength selected, substantially in the range of 2.8 Å to 120 Å, over grazing incidence devices. The reflectivity decreases as the wavelength increases to 120 Å; however, the solid angle increases to provide the enhanced performance. It is, therefore, to be understood that within the scope of the appended claims, the invention may be practiced otherwise than as specifically described.

What is claimed and desired to be secured by Letters Patent of the United States is:

1. A point source non-imaging X-ray focusing device, comprising:
   a focusing element formed from a section transverse to the axis of revolution of an ellipse, said element having a focusing surface;
   a plurality of layer pairs formed on one another on said focusing surface, said layer pairs having X-ray dispersive properties substantially at a predetermined wavelength of interest;
   said layer pairs and said surface designed to focus said X-ray wavelength from a point source to a focus point; and said ellipse having a center plane with respect to said point source and said focus point and said focusing element section being formed from a portion of said ellipse chosen to maximize the total reflected intensity of said X-ray wavelength.

2. The device as defined in claim 1 including:

at least a second focusing element formed from a transverse section of a second ellipse, having a second focusing surface;

a second plurality of layer pairs formed on one another on said second focusing surface; and said first and second surfaces and said first and second plurality of layer pairs designed to focus said X-ray wavelength from a common point source to a common focus point.

3. The device as defined in claim 1 including:

said layer pairs are formed with a graded d spacing to broaden the collected solid angle of said X-ray wavelength.

4. The device as defined in claim 1 wherein:

said focusing element section is formed from a portion of said ellipse predominantly on the source side of said center plane.

5. The device as defined in claim 1 wherein:

said focusing element section is formed from a portion of said ellipse which is entirely on the source side of said center plane.

6. The device as defined in claim 1 wherein:

said wavelength of interest is 9.89 Å; and said section has an equitorial angle of 12.7°.

7. A method of forming a point source X-ray focusing device, comprising:

forming a focusing element from a section transverse to the axis of revolution of an ellipse, and forming said element with a focusing surface thereon;

forming a plurality of layer pairs on said focusing surface with X-ray dispersive properties substantially at a wavelength of interest;

designing said surface and said layer pairs to focus said X-ray wavelength from a point source to a focus point; and said ellipse has an eccentricity function and forming said layer pairs with a particular d spacing and defining said focus utilizing the product of the eccentricity function and the reflectivity intensity defined by the d spacing of said layers.

8. The method as defined by claim 7, wherein:

designing said section includes forming said focusing element section from a portion of said ellipse to maximize the total reflected intensity of said X-ray wavelength.

9. The method as defined by claim 7, including:

forming said layer pair with a graded d spacing to broaden the collected solid angle of said X-ray wavelength.

10. The method as defined by claim 7, including:

defining an equitorial angle by said product and positioning said section about said angle to maximize the total reflected intensity of said X-ray wavelength.

11. The method as defined in claim 10, including:

positioning said section substantially on the source side of said angle for ease of manufacture of said section.

12. The method as defined by claim 7, including:

forming an inverse male section of said focusing element with an inverse focusing surface thereon;

forming a release coating on said inverse surface;

forming said layer pairs on said release coating;

affixing a substrate to said layer pairs; and releasing said release coating from said male section and said layer pairs to form said designed focusing surface and layer pairs on said substrate.

13. The method as defined by claim 12, including:

forming said male section in a number of segments detachable from one another.

* * * * *